Aug. 12, 1958     C. K. BROWN, JR     2,847,031
MIXING FAUCET
Original Filed Feb. 4, 1952     2 Sheets-Sheet 1
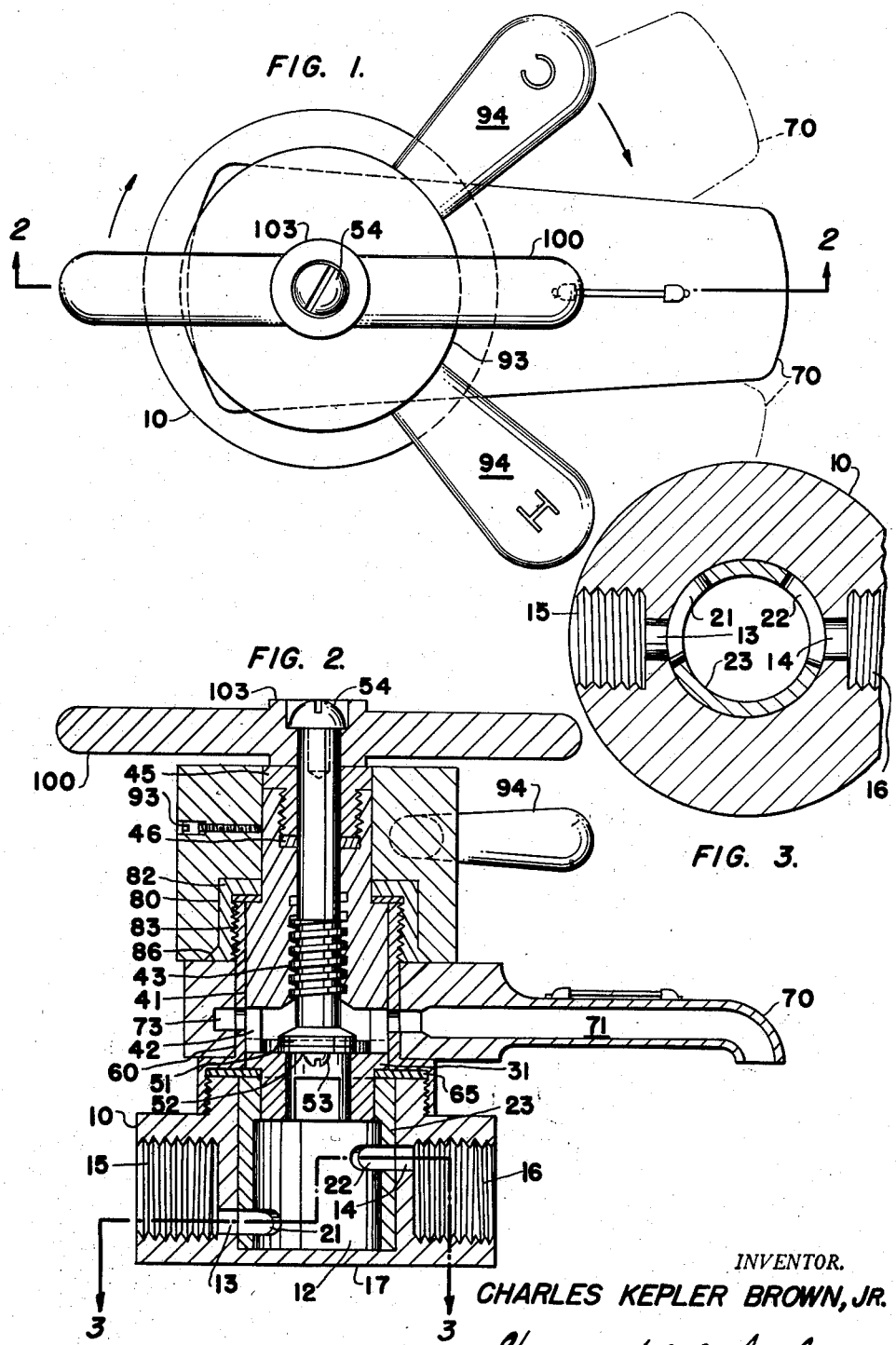
INVENTOR.
CHARLES KEPLER BROWN, JR.
BY Howard J. Whelan
ATTORNEY

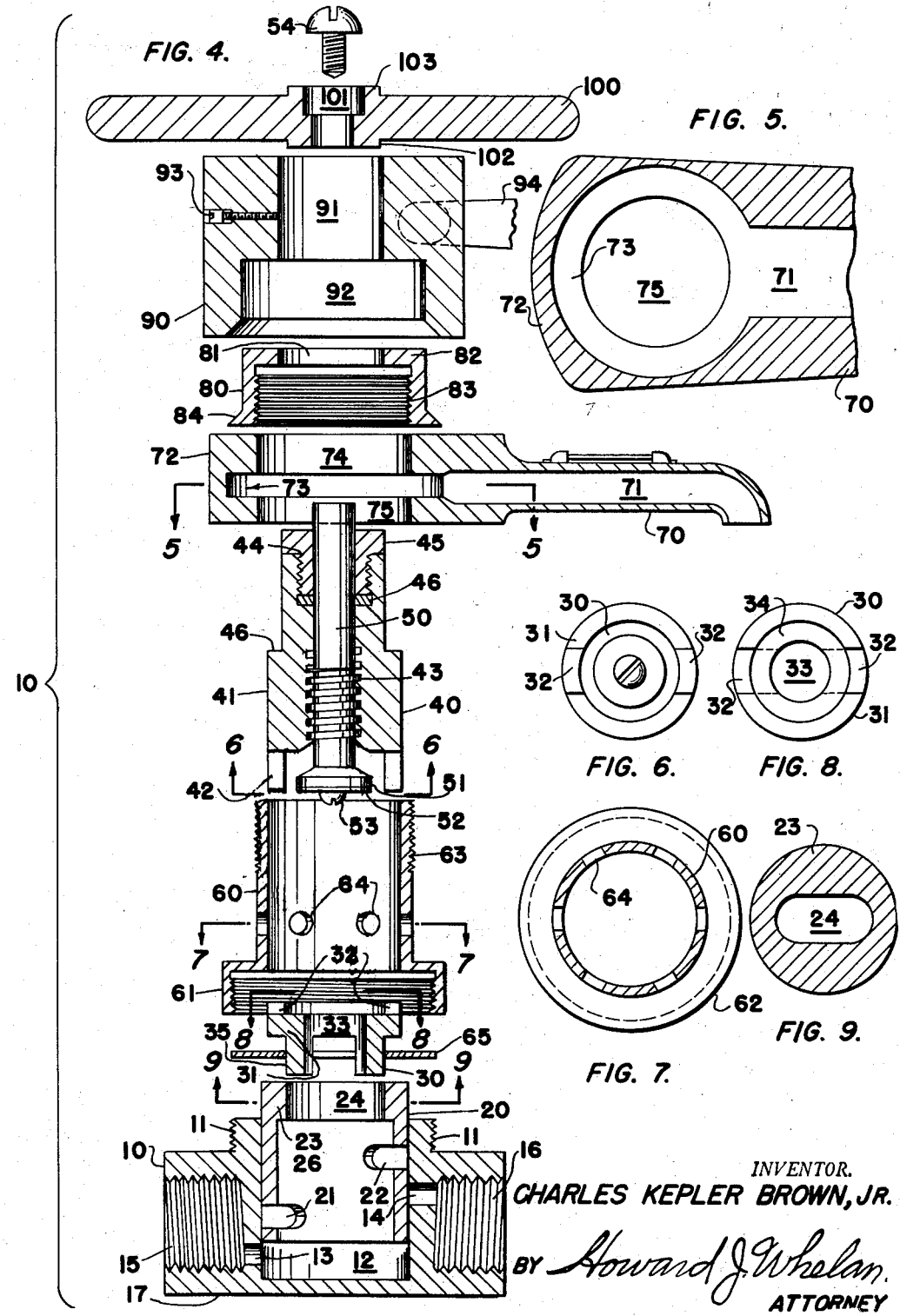
Aug. 12, 1958    C. K. BROWN, JR    2,847,031
MIXING FAUCET
Original Filed Feb. 4, 1952    2 Sheets—Sheet 2
INVENTOR.
CHARLES KEPLER BROWN, JR.
BY Howard J. Whelan
ATTORNEY

United States Patent Office 2,847,031
Patented Aug. 12, 1958

2,847,031

MIXING FAUCET

Charles Kepler Brown, Jr., Verona, N. J.

Substituted for abandoned application Serial No. 269,831, February 4, 1952. This application December 28, 1956, Serial No. 631,991

3 Claims. (Cl. 137—637.4)

This invention relates to household plumbing equipment and more particularly to valves or faucets for mixing and controlling the flow of hot and cold water from piping. This is a substitute for application Serial No. 269,831, filed February 4, 1952, now abandoned.

There are a number of mixing valves for hot and cold water developed and utilized in the commercial field, most of which permit the hot and cold waters to mix spasmodically and non-uniformly. This is due to the manner of directing the streams of water at mixing towards one another and in flowing through a single nozzle.

The water of the hot and cold systems passes through without mixing, especially if the pressure of one system varies or differs considerably from that of the other system, as is often the case. Thus, it frequently happens that the user is burnt by the hot water at a time when he thought it should be warm. This is because the hot stream becomes uppermost in effect in the flow. Sometimes the user is shocked by cold water when he thinks the mixture should be hot. Manipulating the valves of the two lines is usually a matter of individual skill and judgment, to secure the water at the temperature desired through the spout. At the same time, when the mixture is at the proper temperature, the valve has no means to control the quantity of its flow.

It is therefore an object of this invention to provide a new and improved faucet of the mixing type which will avoid one or more of the disadvantages and limitations of the prior art.

Another object of the present invention is to provide a new and improved faucet of the mixing type which will provide for an accurate control of the mixing and the flow of hot and cold water through its spout.

A further object of this invention is to provide a new and improved faucet in which the stem and washer may be removed for replacing the washer without turning off the water supply.

A further object of this invention is to provide a new and improved faucet which will be effective in use and attractive in appearance, while, at the same time, economical to manufacture.

An additional object of the invention is to provide a new and improved faucet for the mixing of hot and cold water streams which will have a structure that will accurately control the spreading of the streams and intermittent mixture of the different waters closely at the port of entrance thereof into the faucet for the effective and proportionate mixing of the streams over the complete range of flow.

It is an additional object of this invention to provide a new and improved faucet for mixing of hot and cold water streams and controlling the volume of mixed waters therefrom and indicating its temperature as it leaves the spout.

It is an additional object of this invention to provide a hot and cold mixing faucet in which a predetermined temperature of the water will not be affected by the volume of flow therefrom.

These and other objects and advantages of this invention will become more apparent from the following specification and drawings in which:

Fig. 1 is a plan view of a mixing valve embodying this invention;

Fig. 2 is a sectional view taken along line 2—2 of Fig. 1;

Fig. 3 is a sectional plan view taken on line 3—3 of Fig. 2;

Fig. 4 is an exploded view of the valve in section;

Fig. 5 is a sectional plan view of a portion of the spout of the valve taken on line 5—5 of Fig. 4;

Fig. 6 is an underview of the stem and clutch taken on line 6—6 of Fig. 4;

Fig. 7 is a sectional view taken on line 7—7 of Fig. 4;

Fig. 8 is a plan view of the key shown on line 8—8 of Fig. 4; and

Fig. 9 is a sectional view of the plug taken on line 9—9 of Fig. 4.

In the structure, used as an illustration of the invention, a mixing valve consists of nine principal sections termed the body 10, plug 20, key 30, clutch 40, stem 50, distributor head 60, spout 72, adjusting sleeve 80, and the operating head 90, including a control handle 100.

Each one of these sections will be structurally analyzed by itself. Referring to Fig. 4, the body 10 of the faucet is of cylindrical form, with a central exteriorly threaded boss 11 surmounting it. It has a central cylindrical chamber 12, with oppositely arranged circular ports 13 and 14, opening through into a threaded inlet 15 for cold water connection and into an inlet 16 for hot water connection, respectively. The port in each instance is nearly as wide as the inlet diameter but only about one-third as high. Each port is on a different level so they are not aligned with each other.

The chamber 12 is open at the top where the boss 11 is situated and it is closed by the wall 17 formed at the bottom in the body. The walls of the chamber 12 are straight and perpendicular.

The plug 20 is cylindrically formed externally to fit closely in the chamber 12. It is open at both ends and also cylindrically formed interiorly with elongated quasi-elliptical ports 21 and 22 in its wall 23 designed to register with the ports 13 and 14 during its rotation in the chamber 12. Ports 13, 14, 21 and 22 are not aligned with each other longitudinally, and their positions are at different radial angles, with each other.

The plug 20 is rotatable on its axis in the chamber 12, and has its ports 21 and 22 so arranged with respect to the ports 13 and 14 that the port 21 will align with port 13 to allow cold water alone to pass through from the inlet 15 as it passes to the interior 26 of the plug 20 first. Then on further rotation of the plug 20 hot water is allowed to come in through the inlet 16 through the ports 14 and 22 to mix with the cold water in the chamber 26.

On further turning of the plug 20, the hot water increases in proportion as the cold water decreases, until a position is reached when the cold water will be shut off and only the hot water passes therethrough. Further rotation of the plug 20 will close off the hot water also, and no water will then pass through. The upper portion of the plug 20 is partly closed in by a wall 23 in which an elongated key slot 24 is provided, and through which the water can escape from the inside of the plug through the valve.

The key 30 is a small circular member with a circular ridge 31 on top oppositely arranged with double grooves 32 with their sides at right angles to their bottoms. A central orifice 33 is provided for the passage of water therethrough, and the upper surface 34 inside the ridge 31 is faced off to form a valve seat.

Two projections or legs 35 extending at right angles to the underside of the member and bordering on the orifice 33, serve when positioned in the valve to fit into the slot 24. The rotation of the key 30 will induce the plug 20 to rotate also, by reason of the action of the legs 35 therein.

The clutch 40 is of cylindrical stepped form with the lower half or portion 41 thereof being of a larger diameter. It has two lugs 42 projecting from this lower portion 41 which fit and engage with the grooves 32 for turning the key 30. The lower portion 41 of the clutch 40 has a step or ledge 46 and is hollow and internally threaded at 43 to take a square threaded member. The axial passage through the clutch member 40 houses the stem 50 extending beyond the threads 43 through a stuffing box 44. The stuffing box 44 is closed by a screw collar 45 pressing on the packing 46 placed in the stuffing box to encompass the passage. The collar 45 is of the same diameter as the clutch 40 so as to be laterally flush therewith.

The stem 50 is a cylindrical shaft peripherally screw threaded to fit the threads 43 and reciprocate therein for a predetermined travel in the clutch. The lower portion of the stem 50 is surmounted by a disc 51 on which a washer 52 is held by a screw 53. This head 51 and washer 52 are employed to fit the seat 34 of the key 30 and to control the flow of water through the orifice 33 axially and between the legs 35. The stuffing box 44, collar 45, and packing 46 make the stem 50 watertight in the clutch 40 in the conventional manner. The stem 50 projects a short distance above the clutch 40, when it is in position and is internally threaded at its free end to receive a holding screw 54.

The distributing head or shell 60 is cylindrical in form with its lower section 61 of larger stepped diameter forming an open cap internally screw threaded. Its walls 62 is relatively thin and had threads 63 externally formed on its upper end portion and holes 64 spaced evenly around on the same level below the thread to permit the flow of water therethrough from the body. A washer 65 fits in the cap 61 to serve as a gasket when the shell is screwed onto the boss 11.

The spout 70 is preferably of the flattened form shown in the drawings, with a flattened flow tube 71 extending in one direction radially from its body 72 which is centrally enlarged to include a circular chamber 73 with which open passages 74 and 75 of smaller diameter connect above and below, respectively. The passages 74 and 75 are large enough to allow the spout to be set on the shell 60. The spout may be swung around on the shell 60 to any horizontal angular position, and the water will be fed through holes 64 in the shell 60, through the circular chamber 73 and out of spout 70.

The adjusting sleeve 80 is a circular cap-like member having an openinge 81 in its top wall 82. The interior 83 is threaded and designed to screw onto the threads 63 of the distributor shell, with the wall 82 resting on the shelf of the clutch 40. Its lower rim 84 extends out and is flared on a bevel slightly beyond the peripheral surface of the sleeve. This sleeve 80 prevents clutch 40 from becoming disengaged from the key 30 and from its removal from the shell 60.

The operating head 90 is of cylindrical form externally and it has an interior cylindrical central passage 91 axially located in its upper portion through which the upper portion of clutch 40 projects. This passage 91 leads to a large circular opening 92 below which is formed to fit the exterior of the adjusting sleeve 80. The passage 91 is of such length and diameter as to suit the upper portion of the clutch 40. A set screw 93, passing through a lateral passage in the head, serves to hold the head 90 to clutch 40 so both will rotate together. Handles 94 project from the operating head 90 radially and they are spaced about 90° from each other. These handles enable the operator to rotate the head to its various horizontal positions, and to change the temperature of the water flowing from the spigot accordingly.

The control handle and indicator 100 is part of the operating mechanism and is of a generally rectangular contour having a countersunk hole 101 in its middle, through which the screw 54 is pushed to screw and hold this handle and indicator 100 to the top of the stem 50 for rotating the latter. A boss 102 is provided below the handle to keep the handle above the surface of the head 90 and permit its easier manipulation. The boss 103 above is for aesthetic reasons.

The operating head 90 is specifically used for turning on the water at the inlets 15 and 16 so it will mix in the chamber 12 in the plug 20 in desired proportions. The head 90 slides over the adjusting sleeve 80 and the spout 70, without rotating them. However since it is locked to the clutch 40, it rotates with it. When the clutch 40 rotates, its lugs 42, engaging with the grooves 32, cause the key 30 to rotate likewise through its legs 35 which are fitted in the key slot 24. This likewise rotates the plug 20.

The rotation of the plug 20 on its axis places its port 21 in alignment with the port 13 to connect with the inlet 15 and to allow the cold water to enter into the interior of the plug 20, pass up through the key 30, through the valve seat opening at the disc on the stem 50 into the distributing shell 60 to the spout 70.

The further rotation of the operating head 90 will produce a mixture of the hot and cold water as the ports 21 and 22, and ports 13 and 14 in the plug wall and the body 10 which align to permit this, to an extent depending on the amount of rotation. Further rotation of the operating head 90 will increase the hot water proportion while the cold water is reduced, until the point is reached in the rotation, where only hot water passes through.

A further movement will close the ports and no water will flow through the valve. This will allow the washer 52 to be changed without shutting off the main water supply.

The operating head 90 may be turned in either direction, and it will not interfere with the operation of handle 100 which is used to control the volume of water received from the valve spout. The handle 100 must be turned in either direction to control the disc 31 through the stem 50 in the clutch 40 on the threads, depending on whether the valve is to be opened to the spout or not.

It may be appreciated that the valve is not only a control valve for the mixing of the hot and cold waters together, but it also controls the amount of flow therefrom. This avoids the necessity of mixing the water in quantities which the user does not need or require. The mixing can be done to suit his individual requirements and then poured out in quantities to further suit him. The operation of controlling the quantity can then be done with the operation of the handle 100 without the use of the operating head, and without causing a change in the temperature of the water or upsetting the mixing proportion of the water supplied.

While but one general form of the invention is shown in the drawings and described in the specification, it is not desired to limit this application for patent to this particular form, as it is appreciated that other forms of construction could be made that would use the same principles and come within the scope of the appended claims.

What is claimed is:

1. In a mixing valve, a body having a cylindrical bore with hot and cold water supply ports connected therewith in one plane, a cylindrical plug within said cylindrical bore, said plug having an internal cylindrical chamber therein and a pair of oppositely situated and offset lateral ports in the wall thereof, said plug being rotatably movable within said cylindrical bore, said lateral ports being selectively connectible with said hot and cold water supply ports in said body, said plug having an internal slot in the upper portion thereof, a key element having lower depending portions fitting in said slot and engaging therewith, whereby rotary movement of said key element causes rotary movement of said plug, said key element having an internal chamber communicating with said cylindrical bore of said plug, said key member having an upper flange and a pair of oppositely disposed grooves on the face of said flange, a hollow shell having an enlarged cylindrical portion fitting over said body and said key element, said shell having a series of circular arranged openings in the wall thereof to permit discharge therethrough of the water admitted through said hot and cold water ports in said body, a cylindrical clutch extending within said shell and having depending lugs engaging with said grooves on said face of said key flange, a valve stem threaded in said clutch, said stem having a valve head at the end thereof controlling the discharge from said internal chamber in key element through the openings in said hollow shell, an operating head secured to said clutch to rotate said clutch and operate said plug, and a control handle secured to said stem to operate said valve head.

2. A mixing valve as set forth in claim 1, including a spout for discharging the water from the openings in said hollow shell, and a sleeve in threaded engagement with said shell to maintain said spout in operating position.

3. A mixing valve as set forth in claim 1, including a spout mounted about said shell to discharge the water from the openings thereof, said spout being adjustably positioned, and a sleeve secured to said shell to maintain the spout in each of its selective positions.

References Cited in the file of this patent

UNITED STATES PATENTS

| | | |
|---|---|---|
| 941,596 | White | Nov. 30, 1909 |
| 1,517,990 | Hinkle | Dec. 2, 1924 |
| 1,737,734 | Schlesinger | Dec. 3, 1929 |
| 2,308,127 | Symmons | Jan. 12, 1943 |